United States Patent [19]
Hong et al.

[11] Patent Number: 6,134,041
[45] Date of Patent: Oct. 17, 2000

[54] POLYGONAL MIRROR ASSEMBLY, LASER SCANNING UNIT FOR PRINTER ADOPTING THE SAME, AND PRINTER

[75] Inventors: Soon-kyo Hong, Seoul; Sung-jin Lee, Kwangmyung; Byoung-young Bae, Pyeongtaek; Seong-hoon Kim, Sungnam; Bu-hyun Sung, Seoul, all of Rep. of Korea

[73] Assignee: Samsung Electronics Co., Ltd., Kyungki-do, Rep. of Korea

[21] Appl. No.: 09/419,306

[22] Filed: Oct. 18, 1999

[30] Foreign Application Priority Data

Oct. 17, 1998 [KR] Rep. of Korea ........................ 98-43439

[51] Int. Cl.[7] .................................................. G02B 26/08
[52] U.S. Cl. ............................ 359/216; 359/200; 347/261
[58] Field of Search ..................................... 359/216–219, 359/855, 872, 198, 200; 347/261

[56] References Cited

U.S. PATENT DOCUMENTS 5,877,884  3/1999  Yanagisawa ............................. 359/198

Primary Examiner—James Phan
Attorney, Agent, or Firm—Sughrue, Mion, Zinn, Macpeak & Seas, PLLC

[57] ABSTRACT

A polygonal mirror assembly is provided with a vibration absorption. The polygonal mirror assembly includes a motor and a polygonal mirror rotatably installed around the rotation shaft of the motor. The polygonal mirror is provided with a plurality of reflective facets. The vibration absorption device is provided for absorbing rotational vibration due to the eccentric mass of the polygonal mirror, by elastically moving in the radial direction of the polygonal mirror. Therefore, the linearity of a scan line scanned from the laser scanning unit to the photoreceptor medium can be maintained.

11 Claims, 6 Drawing Sheets

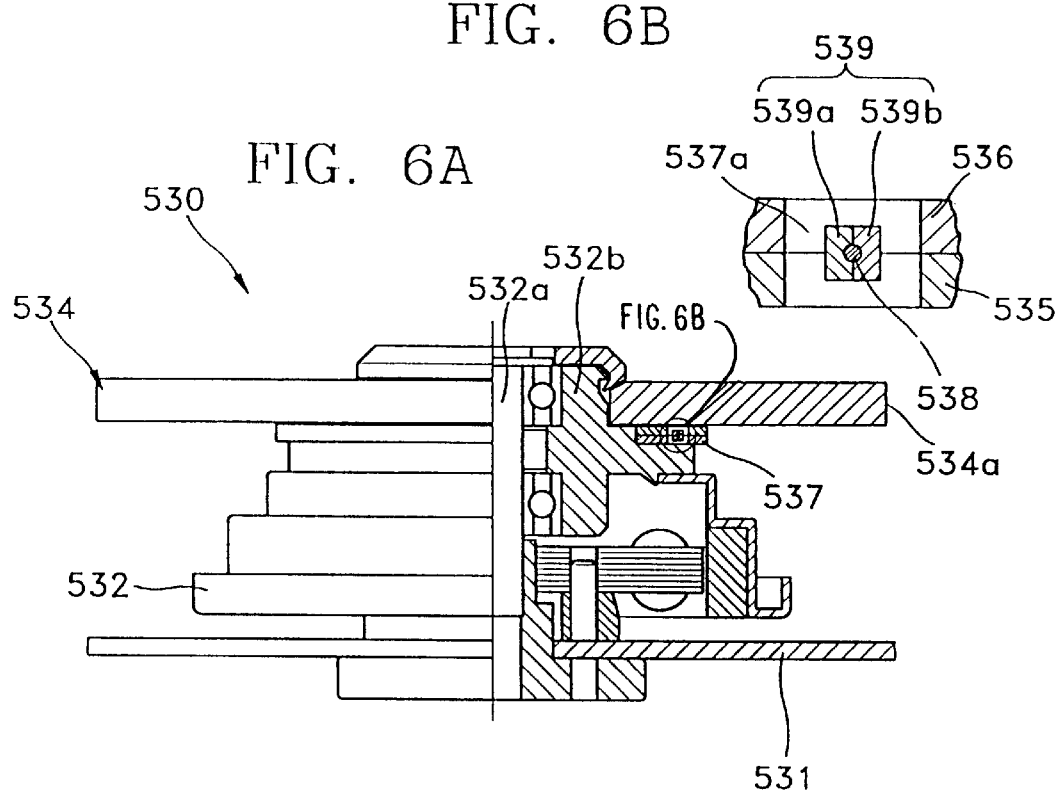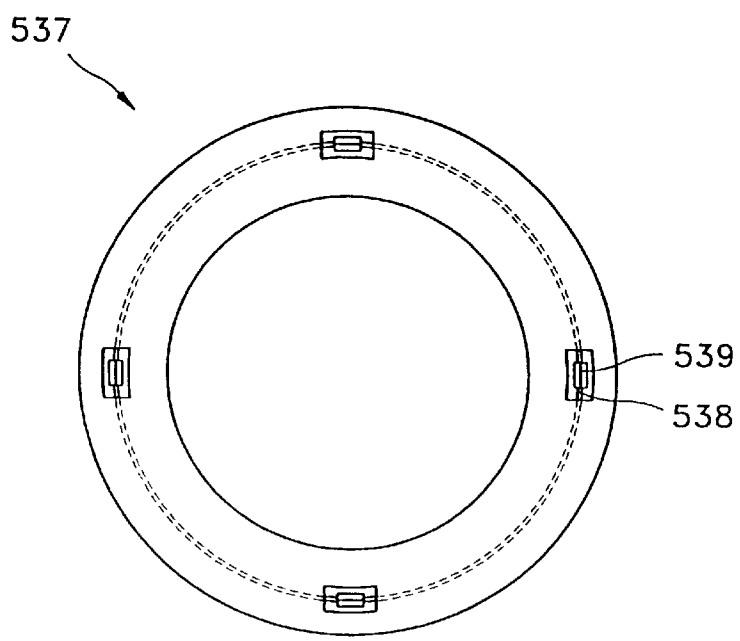

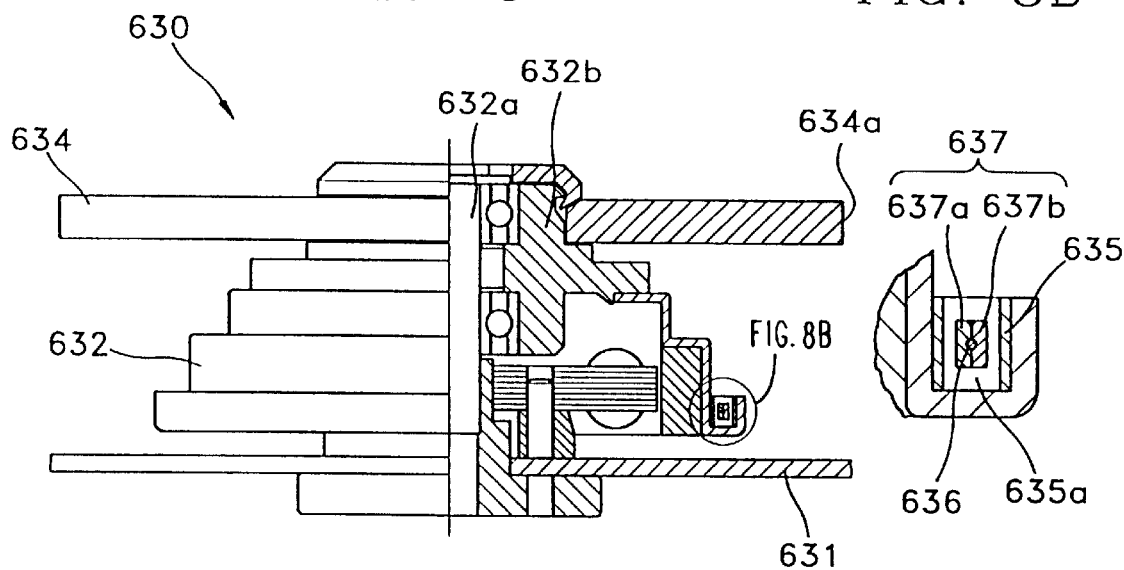
FIG. 8A
FIG. 8B
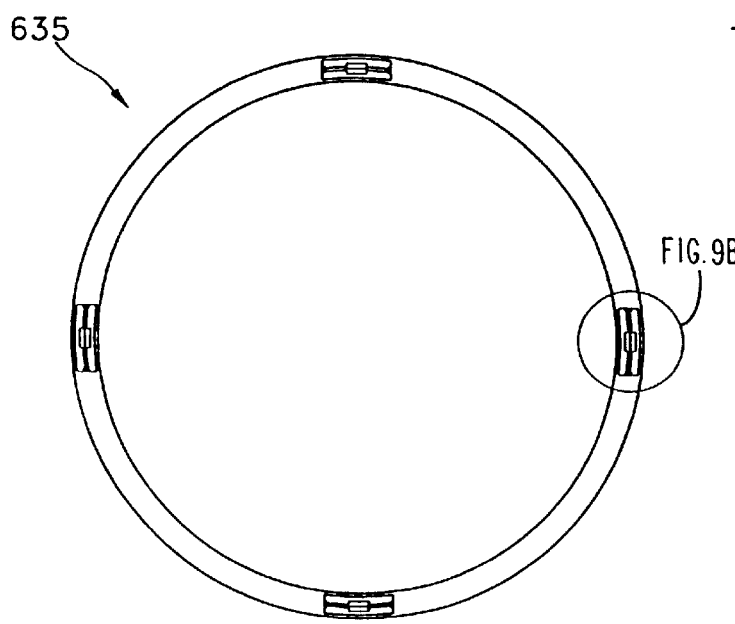
FIG. 9A
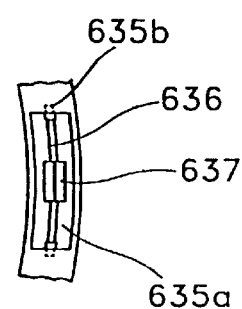
FIG. 9B

POLYGONAL MIRROR ASSEMBLY, LASER SCANNING UNIT FOR PRINTER ADOPTING THE SAME, AND PRINTER

BACKGROUND OF THE INVENTION

1. Field of the Invention

The present invention relates to a polygonal mirror assembly having an improved structure capable of absorbing vibration generated by a polygonal mirror which rotates to deflectingly scan incident light beams, a laser scanning unit for a printer adopting the same, and a printer.

2. Description of the Related Art

A general electrophotographic printer includes a photoreceptor medium such as a photoreceptor belt which rotates along a predetermined path by a driving source, a developing unit for forming an image on an electrostatic latent image area formed on the photoreceptor medium, a transcribing unit for transcribing an image formed on the electrostatic latent image area to paper, and a laser scanning unit (LSU) for scanning laser light onto the photoreceptor medium to form an electrostatic latent image.

The laser scanning unit includes an optical source for irradiating light, an optical means for converting the scanning direction of light toward the photoreceptor medium, and a polygonal mirror assembly for deflecting light emitted from the optical source toward the optical means.

The polygonal mirror assembly includes a motor, and a polygonal mirror having a plurality of reflective facets formed on the side surface to reflect light, emitted from the optical source while the polygonal mirror is rotated by the motor, to the optical means.

However, in the conventional polygonal mirror assembly having such a configuration, it is not possible to precisely meet the center of mass and the center of rotation of the polygonal mirror on the same axis, thus resulting in vibration due to rotation of the polygonal mirror. The polygonal mirror shakes in the radial direction with the vibration, consequently deteriorating the linearity of a scan line scanned from the polygonal mirror. This deterioration of the linearity affects the quality of printing.

SUMMARY OF THE INVENTION

To solve the above problems, it is an objective of the present invention to provide a polygonal mirror assembly having an improved structure such that the rotation vibration of a polygonal mirror can be effectively absorbed by compensating for the unbalanced mass distribution of the polygonal mirror using the self-compensation principle.

It is another objective of the present invention to provide a printer having an improved structure such that the linearity of a scan line scanned to a photoreceptor medium is corrected by adopting the polygonal mirror assembly in a laser scanning unit.

Accordingly, to achieve the first objective, there is provided a polygonal mirror assembly including: a motor; a polygonal mirror rotatably installed around the rotation shaft of the motor, the polygonal mirror provided with a plurality of reflective facets; and a vibration absorption means for absorbing rotational vibration due to the eccentric mass of the polygonal mirror by elastically moving in the radial direction of the polygonal mirror.

The vibration absorption means includes: at least one hole formed in the polygonal mirror; elastic members installed to be capable of being elastically transformed within the hole; and mass bodies installed on the elastic members, respectively, to be able to move in the radial direction of the polygonal mirror.

The mass bodies are symmetrically arranged with respect to the rotation shaft of the polygonal mirror and located within the hole at equal intervals in the circumferential direction of the polygonal mirror, and each of the mass bodies includes a pair of pieces symmetrically coupled to an elastic member.

The elastic member is an elastic pin coupled to both sidewalls of the hole.

In addition, the polygonal mirror includes: a main body on which the plurality of reflective facets are formed; a cover coupled to the main body; and through holes formed through the cover. Furthermore, the vibration absorption means may include: an elastic ring interposed between the main body and the cover to be capable of being elastically transformed within the hole; and mass bodies installed on a portion of the elastic ring on the holes to be able to move in the radial direction of the polygonal mirror.

The vibration absorption means may include: a ring-shaped spacer coaxially installed with respect to the rotation shaft of the polygonal mirror between the motor and the polygonal mirror, the ring-shaped spacer through which at least one hole is formed; an elastic member installed in the hole to be capable of being elastically transformed; and a mass body installed on the elastic member to be able to move in the radial direction of the spacer.

The vibration absorption means may include: a ring-shaped weight coupled to a coupling groove formed on the outer circumferential surface of the motor, the ring-shaped weight through which at least one hole is formed; an elastic member installed in the hole to be capable of being elastically transformed; and a mass body installed on the elastic member to be able to move in the radial direction of the weight.

Installation grooves may be formed on both sidewalls of the hole, and the elastic member is an elastic pin coupled to the installation grooves.

To achieve the second objective, the present invention provides a laser scanning unit for a printer for scanning predetermined light beams onto a photoreceptor medium. The unit may include: an optical source for irradiating light; a polygonal mirror assembly having a polygonal mirror rotatably installed around the rotation shaft of a motor, the polygonal mirror having a plurality of reflective facets for reflecting the light, and a vibration absorption means for absorbing rotational vibration due to the eccentric mass of the polygonal mirror by elastically moving in the radial direction of the polygonal mirror; and an optical means interposed between the photoreceptor medium and the polygonal mirror, for changing the path of light beams deflected by the reflective facets.

To achieve the second objective, the present invention provides a printer including: the laser scanning unit, a developing unit for developing an electrostatic latent image area formed on the photoreceptor medium to develop a predetermined image; and a transcribing unit for transcribing the image formed on the photoreceptor medium to paper.

BRIEF DESCRIPTION OF THE DRAWINGS

The above objects and advantages of the present invention will become more apparent by describing in detail preferred embodiments thereof with reference to the attached drawings in which:

FIG. 6A and FIG. 6B are schematic partially cross-sectional views of a polygonal mirror assembly according to another embodiment of the present invention;

FIG. 7 is a plan view of the spacer shown in FIG. 6;

FIG. 8A and FIG. 8B are partial cross-sectional views of a polygonal mirror assembly according to still another embodiment of the present invention; and FIG. 9A and FIG. 9B are plan views of the weight shown in FIG. 8.

DESCRIPTION OF THE PREFERRED EMBODIMENTS

Figure 1:
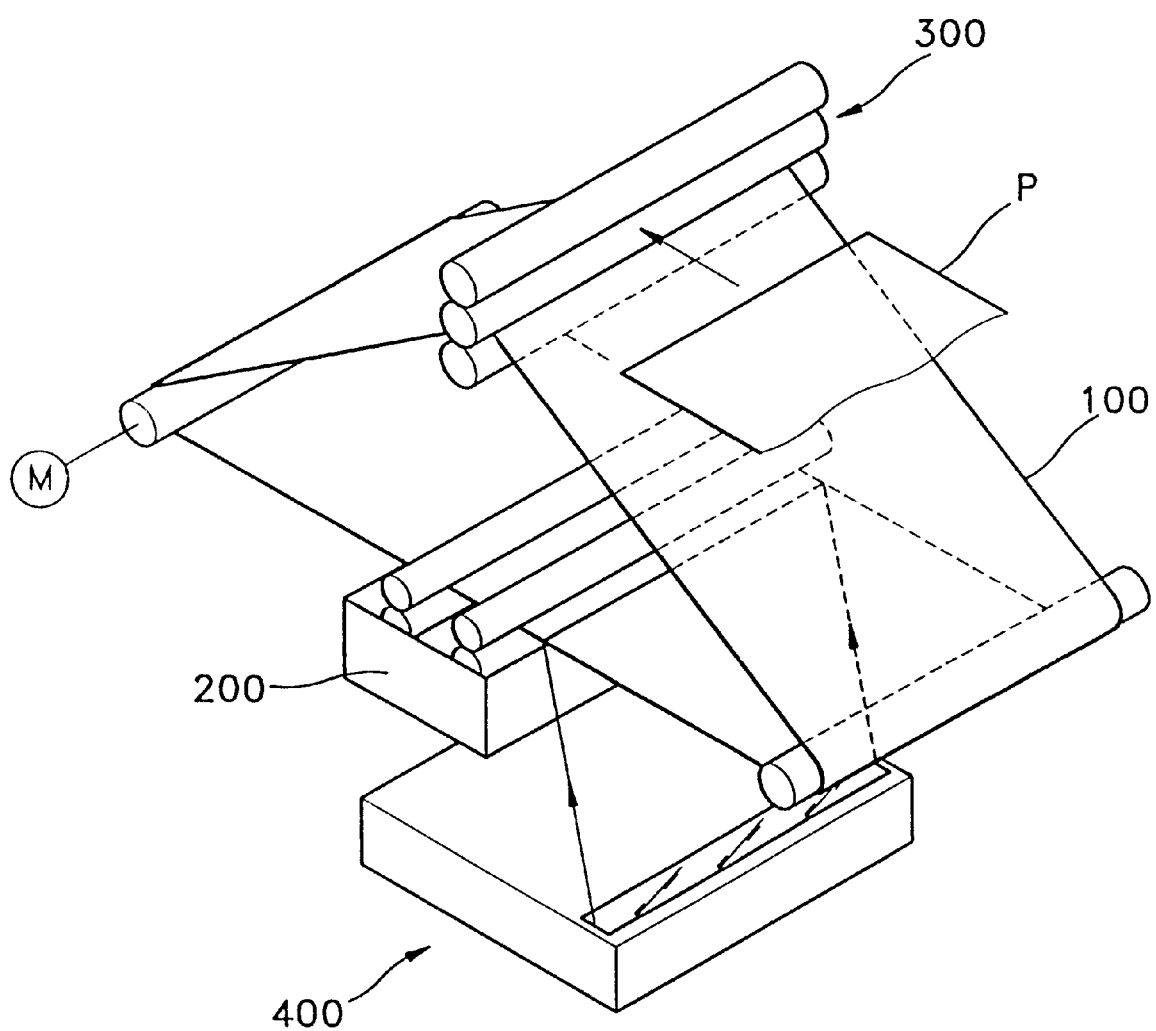
FIG. 1 is a schematic perspective view illustrating a printer according to a preferred embodiment of the present invention.

Referring to FIG. 1, a printer according to a preferred embodiment of the present invention includes a photoreceptor belt 100 which circulates around a predetermined path by a predetermined driving source M, a developing unit 200 for forming an image on an electrostatic latent area formed on the photoreceptor belt 100, a transcribing unit 300 for transcribing an image formed on the electrostatic latent image area to paper (P), and a laser scanning unit (LSU) 400 for scanning laser light onto the photoreceptor belt 100 to form the electrostatic latent image.

Figure 2:
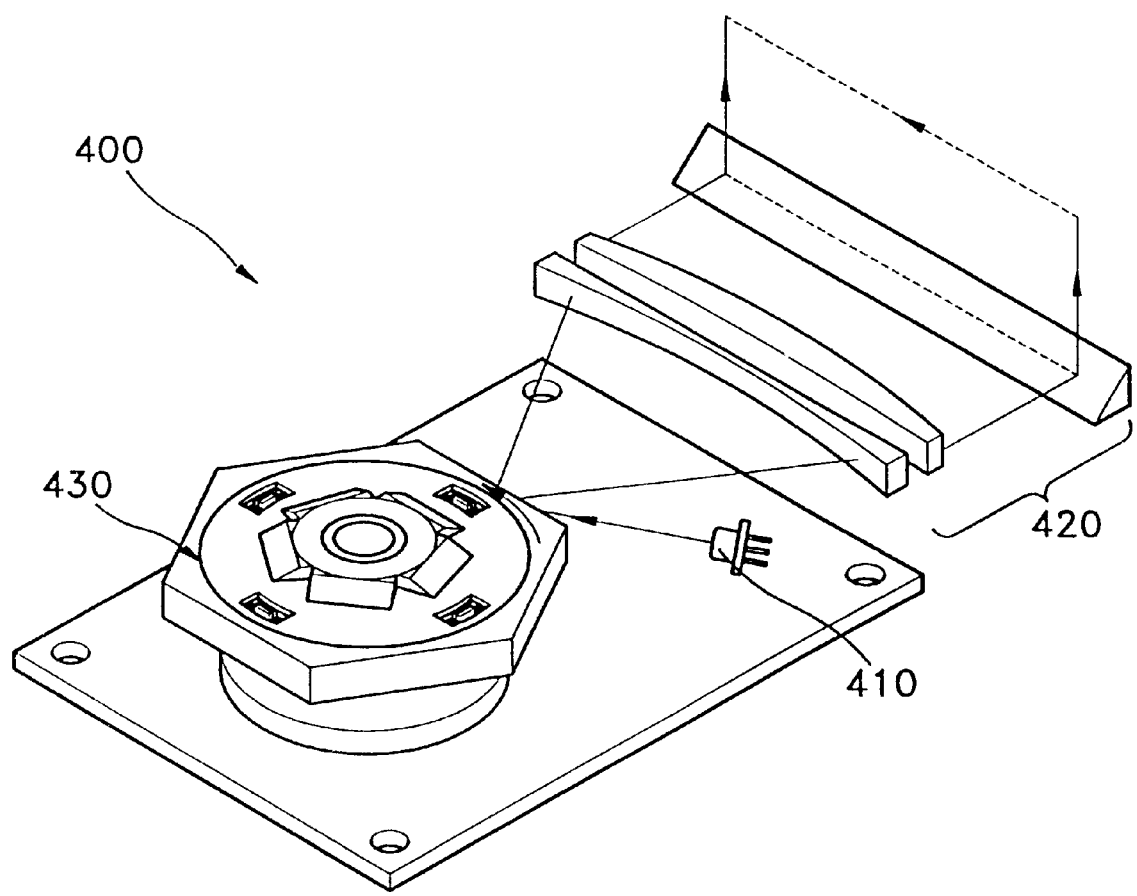
FIG. 2 is a schematic perspective view illustrating the laser scanning unit of FIG. 1.

Referring to FIG. 2, the LSU 400 includes an optical source 410 for irradiating light to be projected onto the photoreceptor belt 100, an optical means 420 for converting the path for the irradiated light so that the light travels toward the photoreceptor belt 100, and a polygonal mirror assembly 430 for deflecting light emitted from the optical source 410 toward the optical means 420.

Figure 3:
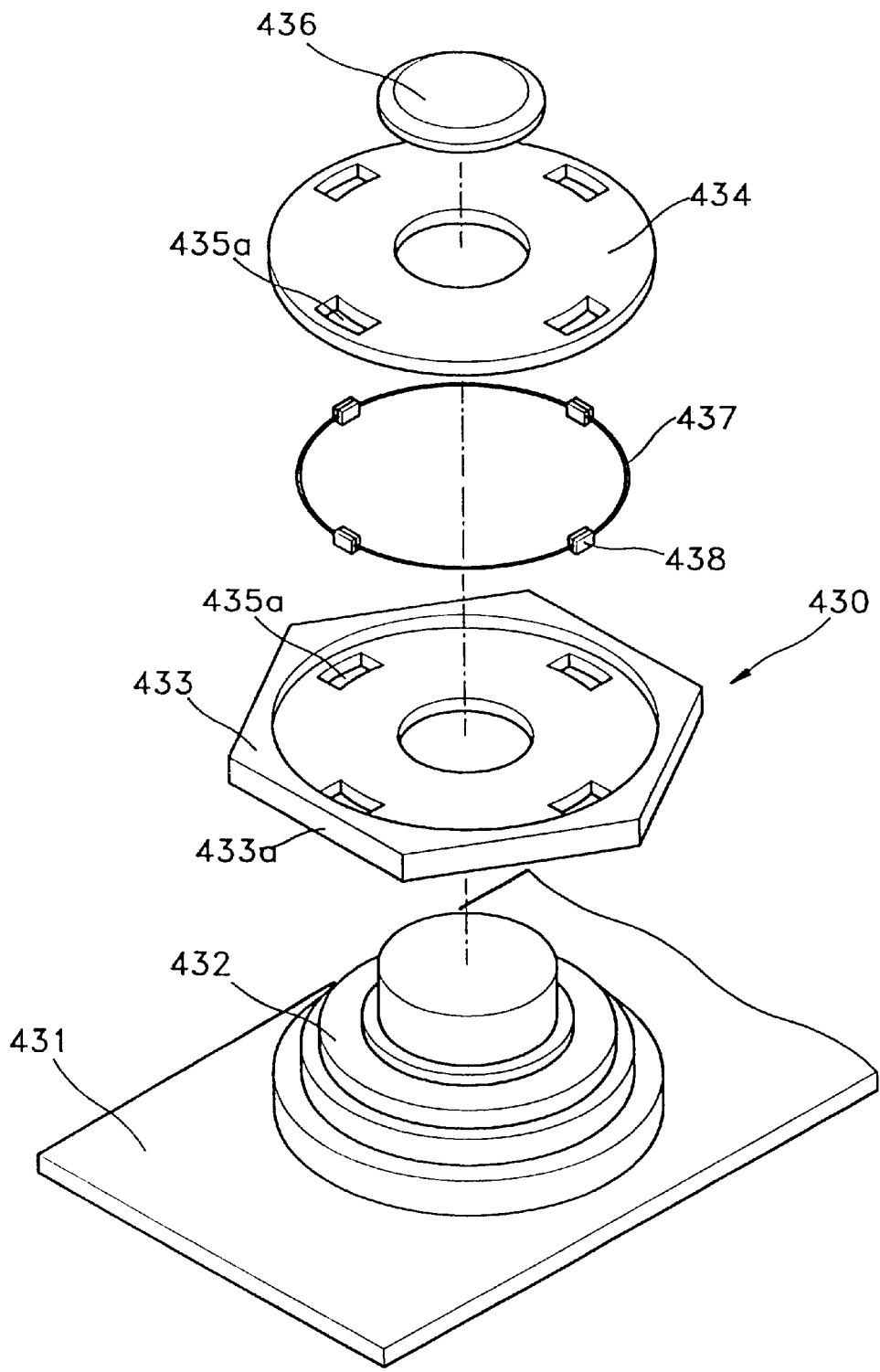
FIG. 3 is a schematic perspective view illustrating the polygonal mirror assembly shown in FIG. 2.
Figure 4:
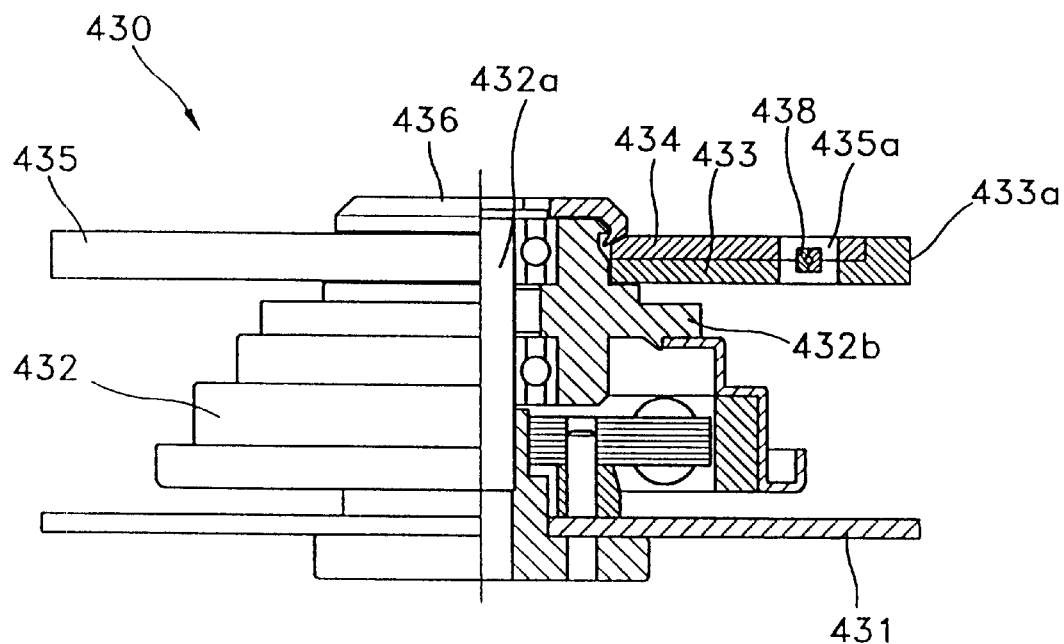
FIG. 4 is a schematic exploded perspective view illustrating the polygonal mirror assembly shown in FIG. 2.

Referring to FIGS. 3 and 4, the polygonal mirror assembly 430 includes a motor 432 installed on a base 431, a polygonal mirror 435 supported by a rotor 432*b* rotatably installed around a rotation shaft 432*a* of the motor 432, and a vibration absorption means for absorbing rotation vibration due to the eccentric mass of the polygonal mirror 435 by moving in the radial direction of the polygonal mirror 435.

The polygonal mirror 435 is clamped to the rotor 432*b* by a damper 436 and rotates with the rotor 432*b*. The polygonal mirror 435 is comprised of a main body 433 formed with a plurality of reflective facets 433*a* for reflecting light emitted from the optical source 410, a cover 434 coupled to the main body 433, and a plurality of holes 435*a* formed through the main body 433 and the cover 434. The main body 433 and the cover 434 are coupled to each other by a locking means, such as screws, an adhesive, or hooks.

The vibration absorbing means includes an elastic ring 437, interposed between the main body 433 and the cover 434, to be capable of being elastically transformed, or distorted, within the holes 435*a*, and mass bodies 438 installed on portions of the elastic ring 437 on the holes 435*a* to be able to move in the radial direction of the polygonal mirror 435.

Figure 5:
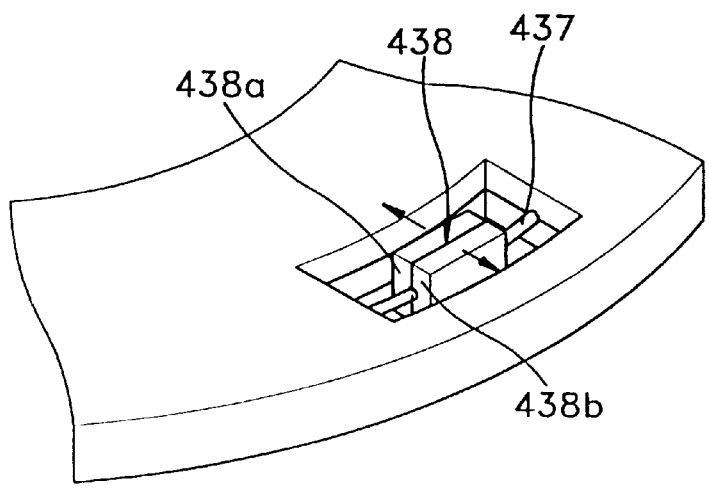
FIG. 5 is a partial perspective view illustrating the essential parts of the polygonal mirror assembly shown in FIG. 2.

The mass bodies 438 are symmetrically arranged with respect to the rotation axis of the polygonal mirror 435, and placed within the holes 435*a* at equal intervals in the circumferential direction of the polygonal mirror 435. Also, as shown in FIG. 5, it is preferable that each of the mass bodies 438 includes a pair of pieces 438*a* and 438*b* which are made of metal and symmetrically coupled to the elastic ring 437.

Also, the mass bodies 438 can have through holes into which the elastic ring 437 can be inserted.

In the operation of a printer according to a preferred embodiment of the present invention having such a configuration, the polygonal mirror 435 is rotated by the motor 432 to deflect light emitted from the optical source 410 to the optical means 420 using the reflective facets 433*a*. At this time, the mass bodies 438 are independently moved a predetermined distance in the radial direction of the polygonal mirror 435 within the holes 435*a* by the elastic ring 437. The movement of each of the mass bodies 438 compensates for the eccentric mass of the polygonal mirror 435, so that the rotation center of the polygonal mirror 435 is not affected by the eccentric mass thereof. Therefore, the rotation vibration of the polygonal mirror 435 is absorbed by the movements of the mass bodies 438 regardless of the eccentric mass of the polygonal mirror 435, so that the polygonal mirror 435 is rotated in a stable state without shaking in the rotating radial direction, and that light can be deflected in one direction to the optical means 420. Accordingly, the linearity of a scan line scanned from the laser scanning unit 400 to the photoreceptor belt 100 is maintained.

Referring to FIGS. 6 and 7, a polygonal mirror assembly 530 according to another embodiment of the present invention comprises a motor 532 installed on a base 531, a polygonal mirror 534 supported by a rotor 532*b* rotatably installed around a rotation shaft 532*a* of the motor 532, and a vibration absorption means for absorbing rotation vibration due to the eccentric mass of the polygon mirror 534 by elastically moving in the radial direction of the polygonal mirror 534. The polygonal mirror 534 rotates with the rotor 532*b*, and has a plurality of side surfaces formed with a plurality of reflective facets 543*a* for reflecting light.

The vibration absorbing means includes a ring-shaped spacer 537, elastic members 538, and mass bodies 539. The ring-shaped spacer 537 is interposed between the motor 532 and the polygonal mirror 534 and has a plurality of holes 537*a*. The elastic members 538 are installed within the holes 537*a*, respectively, to be capable of being elastically transformed. The mass bodies 539 are installed on the elastic members 538, respectively, to be able to move in the radial direction of the spacer 537.

The spacer 537 is installed on the rotor 532*b* to be capable of being coaxially arranged with the polygonal mirror 534, and includes a pair of spacer members 535 and 536 symmetrically coupled to each other.

The elastic member 538 is a ring such as the elastic ring 437 of FIG. 3, and interposed between the spacer members 535 and 536.

The mass bodies 539 are symmetrically arranged with respect to the rotation axis of the polygonal mirror 534, and placed within the holes 537*a* at equal intervals in the circumferential direction of the polygonal mirror 534. Also, each of the mass bodies 539 includes a pair of pieces 539*a* and 539*b* symmetrically coupled to the elastic member 538.

The operation of the polygonal mirror assembly 530 having such a configuration is the same as that of the polygonal mirror assembly 430 shown in FIG. 3.

Referring to FIGS. 8 and 9, a polygonal mirror assembly 630 according to still another embodiment of the present invention comprises a motor 632 installed on a base 631, a polygonal mirror 634 supported by a rotor 632b installed around the rotation shaft 632a of the motor 632, and a vibration absorption means for absorbing rotation vibration due to the eccentric mass of the polygonal mirror 634 by elastically moving in the radial direction of the polygonal mirror 634. The polygonal mirror 634 rotates with the rotor 632b, and has a plurality of side surfaces formed with a plurality of reflective facets 634a for reflecting light.

The vibration absorbing means includes a ring-shaped weight 635, elastic pins 636, and mass bodies 637. The ring-shaped weight 635 is coupled to a coupling groove formed on the circumference of the motor 632, and has at least one hole 635a. The elastic pins 636 are installed within the holes 635a formed through the weight 635, respectively, to be capable of being elastically transformed. The mass bodies 637 are installed on the elastic pins 636, respectively, to be able to move in the radial directions of the weights 635.

The weight 635 is coaxially arranged on the polygonal mirror 634, and rotates with the polygonal mirror 634. The elastic pins 637 are inserted into installation grooves 635b formed on both sidewalls of the hole 635a.

The mass bodies 637 are symmetrically arranged with respect to the rotation axis of the weight 635, and located within the holes 635a at equal intervals in the circumferential direction of the weight 635. Also, each of the mass bodies 637 includes a pair of pieces 637a and 637b symmetrically coupled to the elastic pins 636.

The operation of the polygonal mirror assembly 630 having such a configuration is also the same as that of the polygonal mirror assembly 430 shown in FIG. 3, so it will not be described again.

Although the present invention has been described by taking as an example a plurality of mass bodies provided around a polygonal mirror in FIGS. 3, 7 and 9, the number of mass bodies is just an example. Installation of only one mass body can allow the objects of the present invention to be satisfactorily accomplished.

While the present invention has been shown and described with references to particular embodiments, it will be understood by those skilled in the art that various changes of the embodiments may be made without departing from the spirit and scope of the present invention.

What is claimed is:

1. A polygonal mirror assembly comprising:
   a motor;
   a polygonal mirror rotatably installed around a rotation shaft of the motor, the polygonal mirror provided with a plurality of reflective facets; and
   a vibration absorption means for absorbing rotational vibration caused by an eccentric mass of the polygonal mirror, by elastically moving in the radial direction of the polygonal mirror.

2. The polygonal mirror assembly of claim 1, wherein the vibration absorption means comprises:
   at least one hole formed in the polygonal mirror;
   at least one elastic member installed to be capable of being elastically transformed within the at least one hole; and
   mass bodies installed on the elastic members, respectively, to be able to move in the radial direction of the polygonal mirror.

3. The polygonal mirror assembly of claim 2, wherein the at least one hole is a plurality of holes, and the mass bodies are symmetrically arranged with respect to the rotation shaft of the polygonal mirror and located within the plurality of holes at equal intervals in the circumferential direction of the polygonal mirror.

4. The polygonal mirror assembly of claim 2, wherein each of the mass bodies includes a pair of pieces symmetrically coupled to one of the elastic members.

5. The polygonal mirror assembly of claim 2, wherein the at least one elastic member is an elastic pin coupled to both sidewalls of the hole.

6. The polygonal mirror assembly of claim 1, wherein the polygonal mirror comprises:
   a main body on which the plurality of reflective facets are formed;
   a cover coupled to the main body; and
   through holes formed through the cover, and
   wherein the vibration absorption means comprises:
      an elastic ring interposed between the main body and the cover to be capable of being elastically transformed within the hole; and
      mass bodies installed on a portion of the elastic ring within the holes to be able to move in the radial direction of the polygonal mirror.

7. The polygonal mirror assembly of claim 1, wherein the vibration absorption means comprises:
   a ring-shaped spacer coaxially installed with respect to the rotation shaft of the polygonal mirror between the motor and the polygonal mirror, the ring-shaped spacer having at least one hole formed therethrough;
   at least one elastic member installed in the at least one hole to be capable of being elastically transformed; and
   a mass body installed on the at least one elastic member to be able to move in the radial direction of the spacer.

8. The polygonal mirror assembly of claim 1, wherein the vibration absorption means comprises:
   a ring-shaped weight coupled to a coupling groove formed on the outer circumferential surface of the motor, the ring-shaped weight having at least one hole formed therethrough;
   at least one elastic member installed in the at least one hole to be capable of being elastically transformed; and
   a mass body installed on the at least one elastic member to be able to move in the radial direction of the weight.

9. The polygonal mirror assembly of claim 8, wherein installation grooves are formed on both sidewalls of the hole, and the at least one elastic member is an elastic pin coupled to the installation grooves.

10. A laser scanning unit for a printer for scanning predetermined light beams onto a photoreceptor medium, the unit comprising:
    an optical source for irradiating light;
    a polygonal mirror assembly having a polygonal mirror rotatably installed around a rotation shaft of a motor, the polygonal mirror having a plurality of reflective facets for reflecting the light, and a vibration absorption means for absorbing rotational vibration due to the eccentric mass of the polygonal mirror by elastically moving in the radial direction of the polygonal mirror; and
    an optical means interposed between the photoreceptor medium and the polygonal mirror, for changing the path of light beams deflected by the reflective facets.

11. The laser scanning unit according to claim 10, wherein the printer comprises:
    a developing unit for developing an electrostatic latent image area formed on the photoreceptor medium to develop a predetermined image; and
    a transcribing unit for transcribing the image formed on the photoreceptor medium to paper.

* * * * *